United States Patent
Arai et al.

(10) Patent No.: US 6,169,381 B1
(45) Date of Patent: Jan. 2, 2001

(54) UNIT AND METHOD OF DRIVING WITH MOTOR, AND APPARATUS FOR RECORDING AND/OR REPRODUCING RECORDING MEDIUM

(75) Inventors: Toshiyuki Arai, Chiba; Tatsuya Kushima; Tomonori Kato, both of Kanagawa; Ichiro Nakajima, Tokyo, all of (JP)

(73) Assignee: Sony Corporation, Tokyo (JP)

( * ) Notice: Under 35 U.S.C. 154(b), the term of this patent shall be extended for 0 days.

(21) Appl. No.: 09/319,121
(22) PCT Filed: Oct. 9, 1998
(86) PCT No.: PCT/JP98/04567
§ 371 Date: Aug. 16, 1999
§ 102(e) Date: Aug. 19, 1999
(87) PCT Pub. No.: WO99/19980
PCT Pub. Date: Apr. 22, 1999

(30) Foreign Application Priority Data

Oct. 9, 1997 (JP) .................................................. 9-277693

(51) Int. Cl.$^7$ ........................................................ H02P 6/08
(52) U.S. Cl. .......................... 318/560; 318/561; 318/472; 360/73.03
(58) Field of Search .................................. 318/364, 138, 318/245, 254, 560–696, 472, 439; 388/811; 360/72–78.09; 364/557; 372/38

(56) References Cited

U.S. PATENT DOCUMENTS

| | | | |
|---|---|---|---|
| 3,903,456 | * 9/1975 | Schaefer | 318/472 |
| 5,471,353 | * 11/1995 | Codilian et al. | 360/73.03 |
| 5,563,898 | * 10/1996 | Ikeuchi et al. | 372/38 |
| 5,729,102 | * 3/1998 | Gotou et al. | 318/254 |
| 5,814,957 | * 9/1998 | Yoshida | 318/439 |
| 5,835,302 | * 11/1998 | Funches et al. | 360/78.07 |
| 5,838,591 | * 11/1998 | Yamaguchi | 364/557 |
| 5,896,487 | * 4/1999 | Masten et al. | 388/811 |
| 6,046,559 | * 4/2000 | Iwasaki | 318/364 |

FOREIGN PATENT DOCUMENTS 63-43592  2/1988 (JP) .
8308285  11/1996 (JP) .

* cited by examiner

Primary Examiner—Paul Ip
(74) Attorney, Agent, or Firm—Jay H. Maioli

(57) ABSTRACT

A method for driving the motor of multiple phase, where the number of windings in the coil of each phase can be changed, either in a first mode where all the windings in the coil of each phase are used or a second mode where the number of windings used is smaller than that of the first mode. The driving method includes a source voltage detector for supplying the driving method with a source voltage, a temperature detector for detecting an ambient temperature about the motor, and a controller for switching the action of the driving method to run the motor in either the first mode or the second mode in response to a result of the detection released from the source voltage detector or the temperature detector. Accordingly, the revolution of the motor can be maintained constant hence providing a degree of energy saving.

24 Claims, 10 Drawing Sheets

UNIT AND METHOD OF DRIVING WITH MOTOR, AND APPARATUS FOR RECORDING AND/OR REPRODUCING RECORDING MEDIUM

TECHNICAL FIELD

The present invention relates to a drive apparatus and a driving method with a motor for controlling the number of revolutions of the motor at a constant rate and particularly, to an apparatus for recording and/or playing back on a recording medium where the running speed of the recording medium can be made constant.

BACKGROUND ART

A conventional portable record and/or playback apparatus employing a tape cassette as the recording medium is known using a set of dry cells or a rechargeable battery as the power source. In such record and/or playback apparatus, as the voltage in the power source is decreased, the revolution of the motor becomes slow and will retard the running speed of a magnetic tape. For maintaining the running speed of the magnetic tape at a constant rate, various techniques are provided. One of them involves varying the number of windings used in the motor corresponding to the source voltage.

More particularly, the conventional record and/or playback apparatus has a motor, e.g., of three-phase direct-current type, in which an intermediate tap is provided in the winding coil of each phase, and a driving unit for driving the motor by changing the path of drive current through the coil of each phase in response to a source voltage. It is now defined that a mode where the entire coil is filled with the drive current or the number of windings in the coil is large is termed the first mode and another mode where the drive current is passed between the intermediate tap and one end of the coil or the number of winding in the coil is small is termed the second mode.

The driving unit comprises a motor driver composed of transistors for switching the flow of the drive current in the coil. a voltage detector for detecting the source voltage, and a motor controller for controlling the motor driver in response to the source voltage detected by the voltage detector. When the source voltage supplied from the voltage detector exceeds a threshold level, the motor controller selects the first mode. It selects the second mode when the source voltage is smaller than the threshold level.

In response to pressing of the playback button, the motor in the conventional record and/or playback apparatus is driven in the first mode. When the source voltage detected by the voltage detector exceeds the threshold level, the motor controller directs the motor driver to maintain the first mode. When the source voltage detected by the voltage detector drops to below the threshold level, the motor in the conventional record and/or playback apparatus directs the motor driver to switch the motion of the motor to the second mode.

More particularly, the motor controller selects the first mode when the source voltage exceeds the threshold level to reduce the flow of the drive current passed through the coils and thus provide a degree of energy saving. When the source voltage drops down to smaller than the threshold level and the revolution of the motor is slowed down, the motor controller selects the second mode to increase the flow of the drive current passed through the coils and thus the number of revolutions of the motor so that the revolution of the motor remains constant. In this manner, the motor driver is successfully controlled to drive the motor at a constant number of revolutions and run the magnetic tape at substantially a constant speed.

The threshold voltage is set to a lower limit of the number of revolutions where the servo control for maintaining the constant revolution of the motor is hardly conducted with the source voltage. More specifically, the threshold level is determined by considering the fact that when the ambient temperature about the motor in the conventional record and/or playback apparatus which is placed under a low temperature condition drops down significantly, it may increase the load to the motor.

As shown in FIG. 1, the torque-revolution characteristic of the motor is set such that the motor can normally run at a predetermined number of revolutions under a lower temperature condition, regarding the load P1 on the motor exerted when the conventional record and/or playback is placed at a lower ambient temperature. In other words, the point 101 on the revolution-torque characteristic line has to be located above the load P1 exerted onto the motor under a low temperature condition.

It is however unusual that the conventional record and/or playback apparatus is placed under as a low temperature condition as 5° C. Generally, the conventional record and/or playback apparatus is used at a room temperature, e.g., 20° C. At the room temperature, the average of load to the motor is moderate as denoted by P2 in FIG. 1. For use at the room temperature, the revolution-torque characteristic line is preferably set just above the load P2 as denoted by 102. When it is desired to run the motor at a constant number N of revolutions, there is produced a difference C between the two revolution-torque lines 102 and 101, at a room temperature and a lower temperature. For compensation of the difference C, the motor has to be driven at a higher torque by an increased rate of the drive current applied to the coils.

Also, the setting of the threshold voltage depends considerably on variations of the torque constant, the coil resistance, and the turn-on resistance of transistors used for supplying the coils with the drive current as well as common thermal change and aging of the conventional record and/or playback apparatus which is fabricated in mass production. The threshold voltage has to be determined through translating the above factors to parameters of the load and calculating the largest P1 of the load. In every conventional record and/or playback apparatus, the revolution-torque characteristic of the motor is set to such a grade that the revolution of the motor is maintained at a constant speed. In practice,. the revolution-torque characteristic is held just above the largest load P1 as denoted by the dotted line 101 in FIG. 1.

However, the largest load P1 resulting from a combination of the above factors appears very rarely. It is accepted in general use for holding the revolution-torque characteristic of the motor just above the average load P2 like the real line 102. This creates the difference C between the two revolution-characteristic lines 102 and 101 for the average load P1 and the largest load P2 respectively. For eliminating the difference C, the motor has to be driven at a higher torque with an increased flow of the drive current applied through its coils.

DISCLOSURE OF THE INVENTION

It is an object of the present invention to provide a drive apparatus and a drive method with a motor capable of maintaining the revolution of the motor at a constant number of revolutions and having a higher degree of energy saving.

It is another object of the present invention to provide an apparatus and a method for recording and/or playing back on a recording medium capable of maintaining the running of the recording medium at a constant speed and having a higher degree of energy saving.

For achievement of the foregoing object of the present invention, a drive apparatus with a motor is provided comprising: a driving means for driving the motor of multiple phase, of which the number of windings in the coil of each phase can be changed, either in a first mode where all the windings in the coil of each phase are used or a second mode where the number of windings used is smaller than that of the first mode; a source voltage detecting means for supplying the driving means with a source voltage; a temperature detecting means for detecting an ambient temperature about the motor; and a controlling means for switching the action of the driving means to run the motor in either the first mode or the second mode in response to a result of the detection released from the source voltage detecting means or the temperature detecting means. Accordingly, the revolution of the motor can be maintained a at contant speed regardless of a change in the load to the motor caused by variation of the ambient temperature about the motor and a change in the source voltage while the energy saving will be ensured.

In practice, the controlling means may switch from the first mode to the second mode when the source voltage detecting means detects that the source voltage supplied from a battery as the power source drops to lower than a predetermined voltage level. Alternatively, the controlling means may switch from the first mode to the second mode when the result of detection of the temperature detecting means drops to lower than a predetermined temperature level. The driving means may include a plurality of switching devices actuated by the controlling means for switching the flow of electric current through the windings of each phase of the motor.

An apparatus for recording and/or playing back on a recording medium according to the present invention comprises: a head means for recording or playing back on the recording medium; a record and/or playback block having a multiple-phase motor for moving the recording medium relative to the head means; a driving means for driving the motor, of which the number of windings in the coil of each phase can be changed, either in a first mode where all the windings in the coil of each phase are used or in a second mode where the number of windings used is smaller than that of the first mode; a source voltage detecting means for feeding a source voltage from a battery to the driving means; a temperature detecting means for detecting an ambient temperature about the motor; and a controlling means for switching the action of the driving means to run the motor in either the first mode or the second mode in response to a result of the detection released from the source voltage detecting means or the temperature detecting means. Accordingly, the revolution of the motor can be maintained at a constant speed regardless of a change in the load to the motor caused by variation of the ambient temperature about the motor and a change in the source voltage. This allows the recording medium of a tape form, for example, to be forwarded at a constant speed for conducting a favorable recording or playback action and a degree of the energy saving to be ensured hence increasing the time for continuous use of the record and/or playback apparatus.

In practice, the controlling means may switch from the first mode to the second mode when the source voltage detecting means detects that the source voltage supplied from the battery drops to lower than a predetermined voltage level. Alternatively, the controlling means may switch from the first mode to the second mode when the result of detection of the temperature detecting means drops to lower than a predetennined temperature level. The driving means may include a plurality of switching devices actuated by the controlling means for switching the flow of electric current through the windings of each phase of the motor.

Another drive apparatus with a motor according to the present invention comprises: a driving means for driving the motor of multiple phase, of which the number of windings in the coil of each phase can be changed, either in a first mode where all the windings in the coil of each phase are used or a second mode where the number of windings used is smaller than that of the first mode; a revolution detecting means for detecting the revolution of the motor; and a controlling means for switching the action of the driving means to run the motor in either the first mode or the second mode in response to a result of the detection released from the revolution detecting means. Accordingly, the revolution of the motor can be maintained constant while the energy saving will be ensured.

In practice, the controlling means may switch the action of the driving means corresponding to a difference between the number of revolutions of the motor driven in the second mode and the number of revolutions of the motor driven in the first mode. More particularly, the controlling means may switch the action of the driving means to the second mode when the difference between the number of revolutions of the motor driven in the second mode and the number of revolutions of the motor driven in the first mode is not smaller than a predetermined value. Also, the controlling means may first direct the driving means to run the motor in the second mode and then detect the number of revolutions of the motor driven in the second mode. The revolution detecting means may detect the number of revolutions of the motor on the basis of the period of a counter-electromotive force in the coils of the motor. The driving means may have a plurality of switching devices actuated by the controlling means for switching the flow of electric current through the windings of each phase of the motor.

Another apparatus for recording and/or playing back on a recording medium according to the present invention comprises: a head means for recording or playing back on the recording medium; a record and/or playback block having a multiple-phase motor for moving the recording medium relative to the head means; a driving means for driving the motor, of which the number of windings in the coil of each phase can be changed, either in a first mode where all the windings in the coil of each phase are used or in a second mode where the number of windings used is smaller than that of the first mode; a revolution detecting means for detecting the revolution of the motor; and a controlling means for switching the action of the driving means to run the motor in either the first mode or the second mode in response to a result of the detection released from the revolution detecting means. Accordingly, the revolution of the motor can be maintained at a constant speed rate. This allows the recording medium of a tape form, for example, to be forwarded at a constant speed for conducting a favorable recording or playback action and a degree of the energy saving to be ensured hence increasing the time for continuous use of the record and/or playback apparatus.

In practice, the controlling means may switch the action of the driving means corresponding to a difference between the number of revolutions of the motor driven in the second mode and the number of revolutions of the motor driven in the first mode. More specifically, the controlling means may switch the action of the driving means to the second mode when the difference between the number of revolutions of the motor driven in the second mode and the number of revolutions of the motor driven in the first mode is not smaller than a predetermined value. The controlling means may first direct the driving means to run the motor in the second mode and then detect the number of revolutions of the motor driven in the second mode. The revolution detecting means may detect the number of revolutions of the motor on the basis of the period of a counter-electromotive force in the coils of the motor. The driving means may include a plurality of switching devices actuated by the controlling means for switching the flow of electric current through the windings of each phase of the motor.

A driving method with a motor according to the present invention comprises the steps of: detecting the revolution of the motor of multiple phase; and in response to a result of the detection of the revolution detecting means, switching the motion of the motor between a first mode where all the windings of the coil of each phase in the motor are used and a second mode where the number of windings used is smaller than that of the first mode to drive the motor, hence ensuring a degree of the energy saving. The switching between the first mode and the second mode may be carried out depending on a difference between the number of revolutions of the motor driven in the second mode and the number of revolutions of the motor driven in the first mode. The action may be switched to the second mode when the difference between the number of revolutions of the motor driven in the second mode and the number of revolutions of the motor driven in the first mode is not smaller than a predetermined value. Also, the motor may be driven in the second mode and then, the detection of its revolutions in the second mode follows.

BEST MODES FOR CARRYING OUT THE INVENTION

A record/playback apparatus for a tape cassette according to the present invention will be described in more detail referring to the accompanying drawings.

Figure 1:
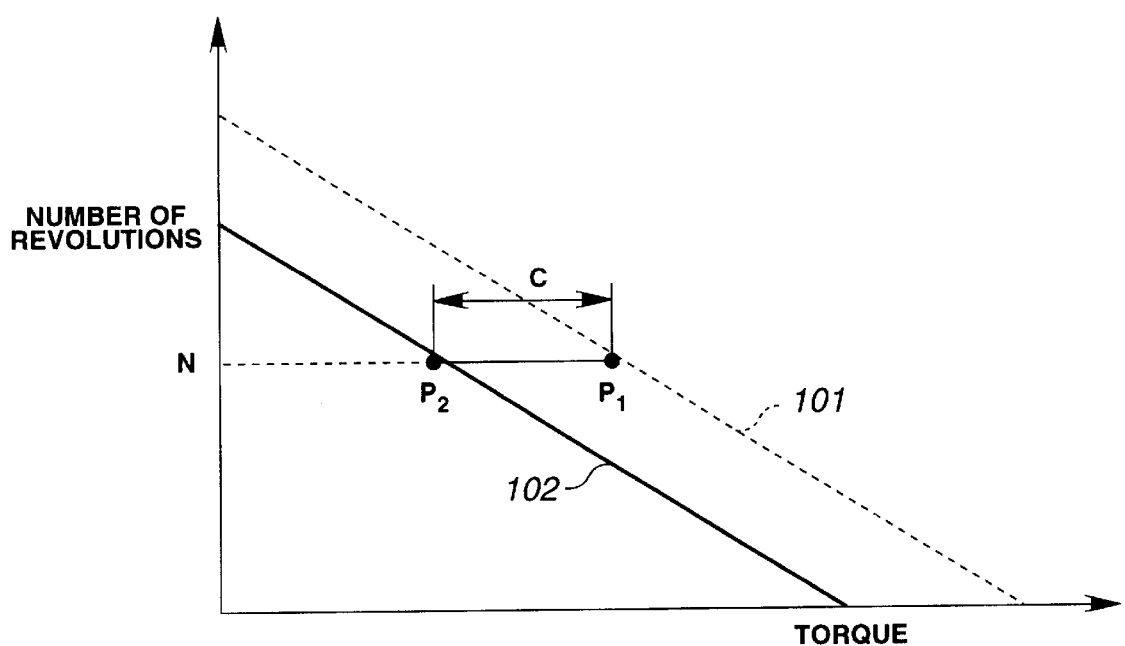
FIG. 1 is a diagram illustrating the revolution-torque characteristic of a motor in a conventional record and/or playback apparatus.
Figure 2:
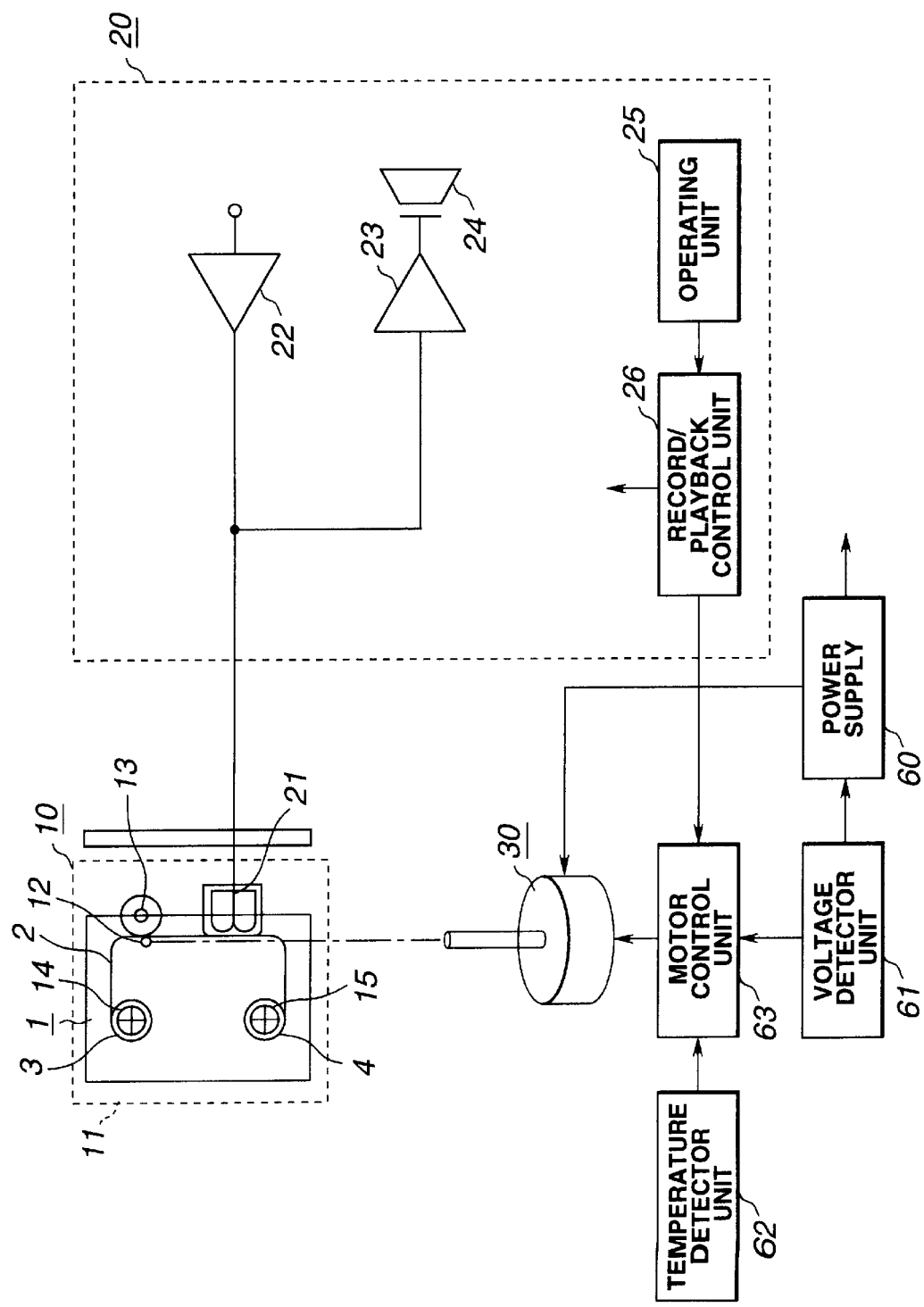
FIG. 2 is a block diagram illustrating an arrangement of a record/playback apparatus according to the present invention.

The record/playback apparatus of the present invention is minimized to a size which is substantially equal to that of a tape cassette 1, as shown in FIG. 2, and comprises a tape running mechanism 10 for running a magnetic tape 2 on which a data signal such as an audio signal is recorded. a record/playback block 20 for amplifying the data signal from the magnetic tape 2, and a motor 30 for driving the tape running mechanism 10. When the tape cassette 1 has been loaded, the record/playback apparatus drives the tape running mechanism 10 to run the magnetic tape 2 at a constant speed and a record/playback head 21 to write or read the data signal.

The tape running mechanism 10 has a cassette loading unit 11 where the tape cassette 1 is loaded at a position. The cassette loading unit 11 includes a capstan 12 and a pinch roller 13 for running the magnetic tape 2 at the constant speed, and reel axles 14 and 15 for rotating tape reels 3 and 4 respectively on which the magnetic tape 2 in the tape cassette 1 is wound. When the tape cassette 1 has been loaded into the cassette loading unit 11, the record/playback head 21 block moves into the tape cassette 1 to directly scan the magnetic tape 2. While the magnetic tape 2 runs between the capstan 12 and the pinch roller 13, it is wound on the tape reel 3 or 4 driven by the rotation of the reel axle 14 or 15.

The record/playback block 20 comprises the record/playback magnetic 21 for recording and playing back the data signal on the magnetic tape 2, a record amplifier 22 for amplifying the data signal entered from a microphone or the like and delivering it to the record/playback head 21, a preamplifier 23 for processing the data signal played back by the record/playback head 21, and a loudspeaker 24 for releasing the data signal amplified by the preamplifier 23. The record/playback block 20 also has an operating unit 25 for recording and playing back the data signal or forwarding and rewinding the magnetic tape and a record/playback control unit 26 responsive to an operating signal from the operating unit 25 for controlling the action of the record amplifier 22 and the preamplifier 23. The operating unit 25 comprises a set of a record button, a playback button, a forward button, a rewind button, and other control buttons, or namely a group of press-type operating button switches. When any of the buttons is pressed, the operating unit 25 supplies the record/playback control unit 26 with a corresponding operating signal. For example, when the record button is pressed, a record start signal is fed from the operating unit 25 to the record/playback control unit 26. When the playback button is pressed, a playback start signal is fed to the record/playback control unit 26.

The record/playback control unit 26 when receiving the operating signal from the operating unit 25 controls the action of the record amplifier 22 and the preamplifier 23 and simultaneously delivers a control signal to a motor controller 63 which will be described later. For example, when receiving the record start signal. the record/playback control unit 26 delivers a record control signal to the record/playback head 21, the record amplifier 22. and a motor control unit 63, and other relevant components. When receiving the playback start signal, the record/playback control unit 26 delivers a playback control signal to the record/playback head 21, the preamplifier 23, and the motor control unit 63, and other relevant components.

When the playback button is pressed, the record/playback block 20 allows the data signal read out from the magnetic tape 2 by the record/playback head 21 to be amplified by the preamplifier 23 and emitted from the loudspeaker 24. When the record button is pressed, the record/playback block 20 permits the data signal which is an electric signal converted, e.g., by a microphone to be amplified by the record amplifier 22 and written onto the magnetic tape 2 by the record/playback head 21.

The motor 30 for driving the tape running mechanism 10 rotates the capstan 12 to run the magnetic tape 2 at the constant speed. More particularly, the motor 30 is assembled integrally with the capstan 12 and joined by an endless belt to a flywheel for avoiding the eccentric motion of the capstan 12 during the rotation. The driving power of the motor 30 is transmitted to the capstan 12 while it rotates the flywheel via the endless belt. Also, in the forward mode and the rewind mode for running the magnetic tape 2 at a faster speed as well as the recording and playback mode, the motor 30 drives the reel axles 14 and 15 via a drive transmission mechanism not shown to rewind the magnetic tape 2 onto the tape reels 3 and 4. Moreover, for starting the recording or playback mode, the motor 30 drives the record/playback head 21 and the pinch roller 13 via a link mechanism not shown to be moved from the standby position outside the tape cassette 1 to the record/playback position where they come in direct contact with the magnetic tape 2 in the tape cassette 1.

Figure 3:
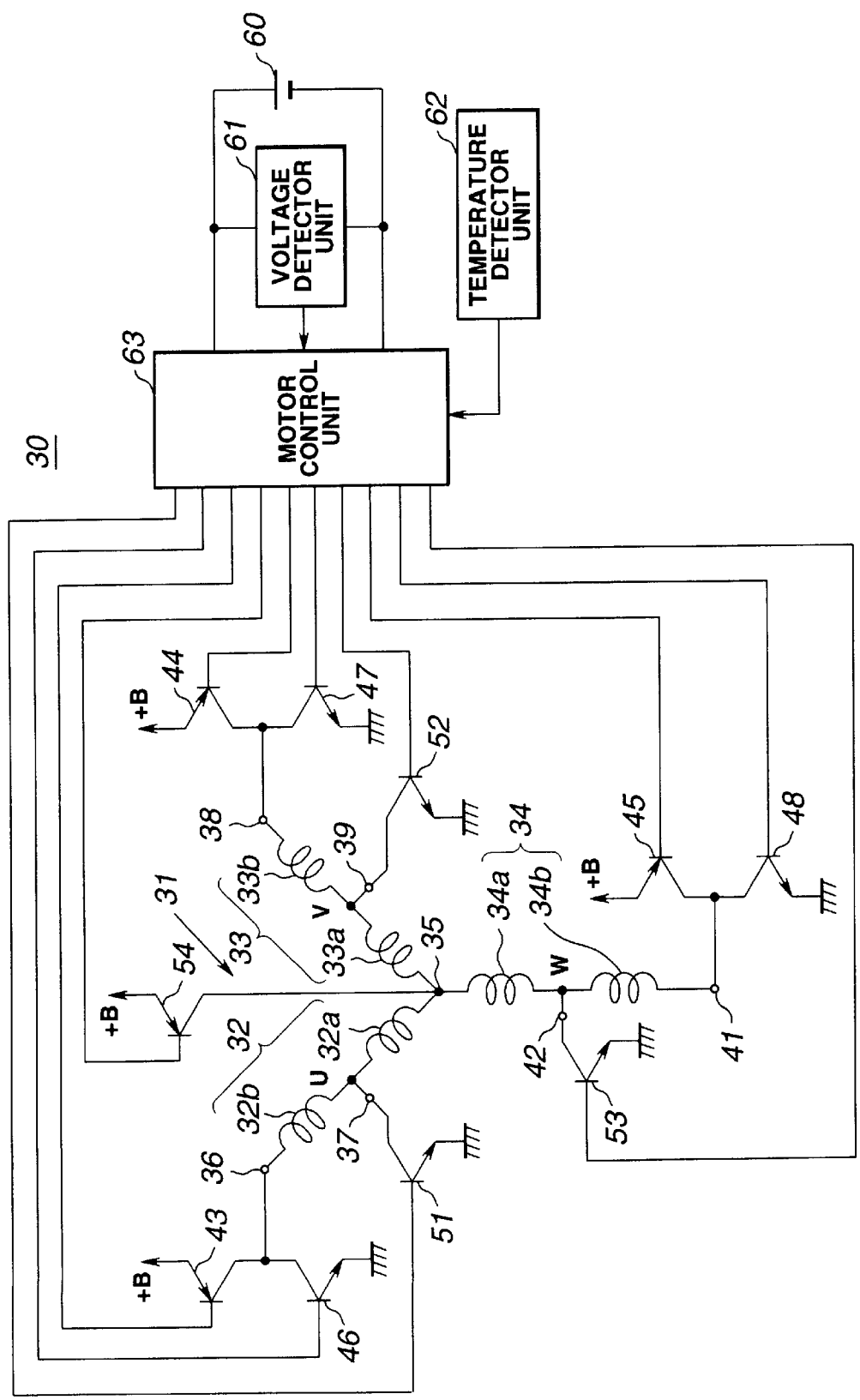
FIG. 3 is a circuit diagram illustrating a motor in the record/playback apparatus.

More specifically, the motor 30 is a three-phase direct-current motor comprising a stator 31 and a rotor not shown, as illustrated in FIG. 3. The rotor consists mainly of an annular permanent magnet where S poles and N poles are alternately allocated in the circumferential direction. The stator 31 has a phase U winding coil 32, a phase V winding coil 33, and a phase W winding coil 34. The three winding coils 32 to 34 in the stator 31 are arranged 60 degrees open from one another. One end of each of the three-phase winding coils 32 to 34 is joined to a common node 35.

The other end of the phase U winding coil 32 is connected to a terminal 36. The phase U winding coil 32 has an intermediate tap 37 provided at an intermediate region thereof, where the windings are divided into substantially two halves, for changing the number of windings. It is herein designated that the winding half from the node 35 to the intermediate tap 37 is a first coil 32a and the other half from the intermediate tap 37 to the terminal 36 is a second coil 32b.

Similarly, the other end of the phase V winding coil 33 is connected to a terminal 38. The phase V winding coil 33 has an intermediate tap 39 provided at an intermediate region thereof, where the windings are divided into substantially two halves, for changing the number of windings. It is herein designated that the winding half from the node 35 to the intermediate tap 39 is a first coil 33a and the other half from the intermediate tap 39 to the terminal 38 is a second coil 33b.

Also, the other end of the phase W winding coil 34 is connected to a terminal 41. The phase W winding coil 34 has an intermediate tap 42 provided at an intermediate region thereof, where the windings are divided into substantially two halves, for changing the number of windings. It is herein designated that the winding half from the node 35 to the intermediate tap 42 is a first coil 34a and the other half from the intermediate tap 42 to the terminal 41 is a second coil 34b.

The motor 30 is driven by a motor driver which comprises a first group of transistors 43 to 45 and a second group of transistors 46 to 48 connected to the other ends of the phase U, V, and W winding coils 32 to 34 for driving the motor 30 and a third group of transistors 51 to 53 connected to the intermediate taps 37, 39, and 42 of the phase U. V, and W winding coils 32 to 34 for changing the number of windings of the phase U, V, and W winding coils 32 to 34.

The first transistors 43 to 45 are of PNP type and the second transistors 46 to 48 are of NPN type. The first transistors 43 to 45 are connected at their emitter to a source +B. The collectors of the first transistors 43 to 45 are connected to their corresponding terminals 36, 38, and 41 and to the second transistors 46 to 48. The collectors of the second transistors 46 to 48 are connected to their corresponding terminals 36, 38, and 41. The second transistors 46 to 48 are also connected at their emitter to the ground. A combination of the first transistors 43 to 45 and the second transistors 46 to 48 drive the motor 30 through switching the direction of drive current.

The third transistors 51 to 53 are of NPN type for changing the number of windings of the winding coils 32 to 34. The third transistors 51 to 53 are connected at their collector to the intermediate taps 37, 39, and 42 and at their emitter to the ground.

The collector of a fourth PNP type transistor 54 is connected to the common node 35 which is joined to the one end of the phase U, V, and W winding coils 32 to 34. All the first to fourth transistors 43 to 48 and 51 to 54 are connected at their base to the motor control unit 63 which will be described later.

Figure 4:
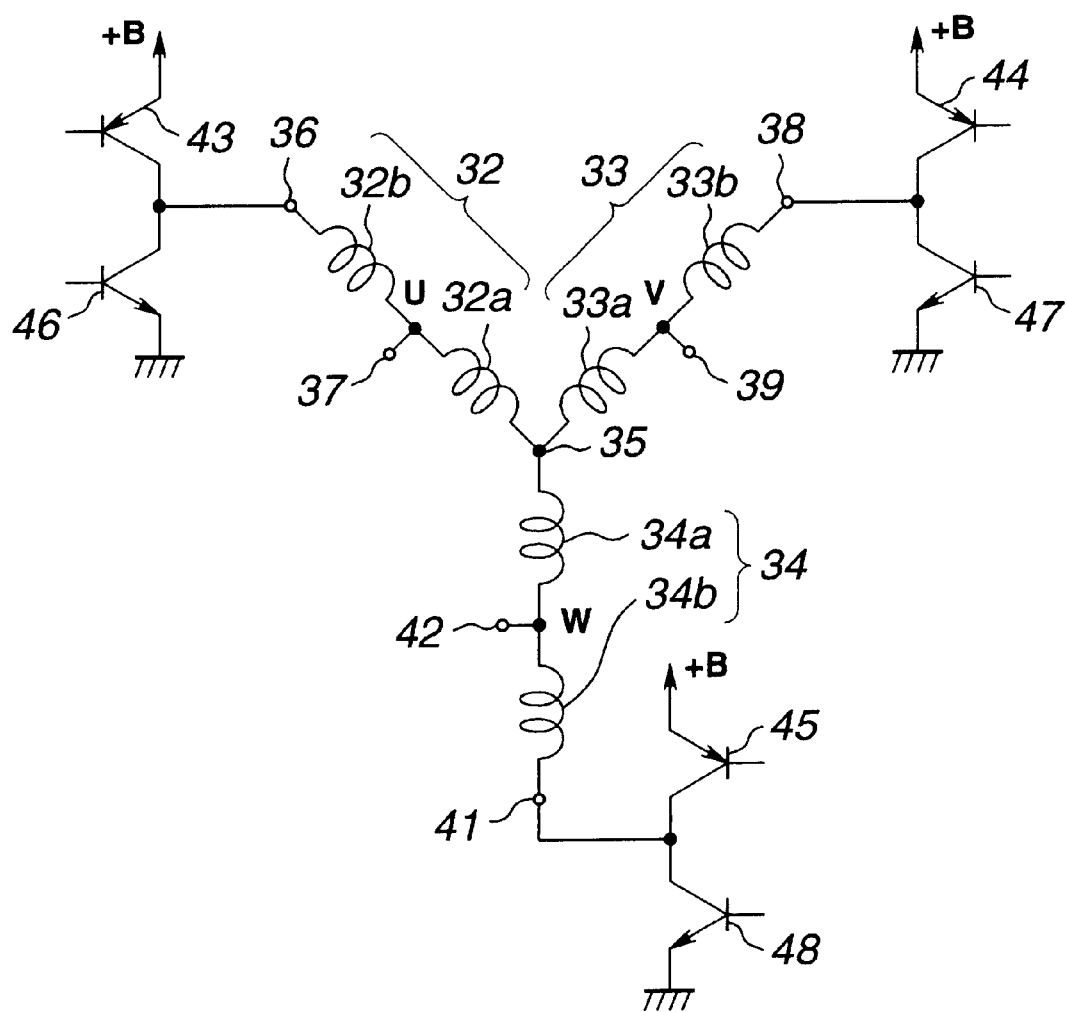
FIG. 4 is a circuit diagram illustrating a flow of current through the motor driven in the first mode.
Figure 5:
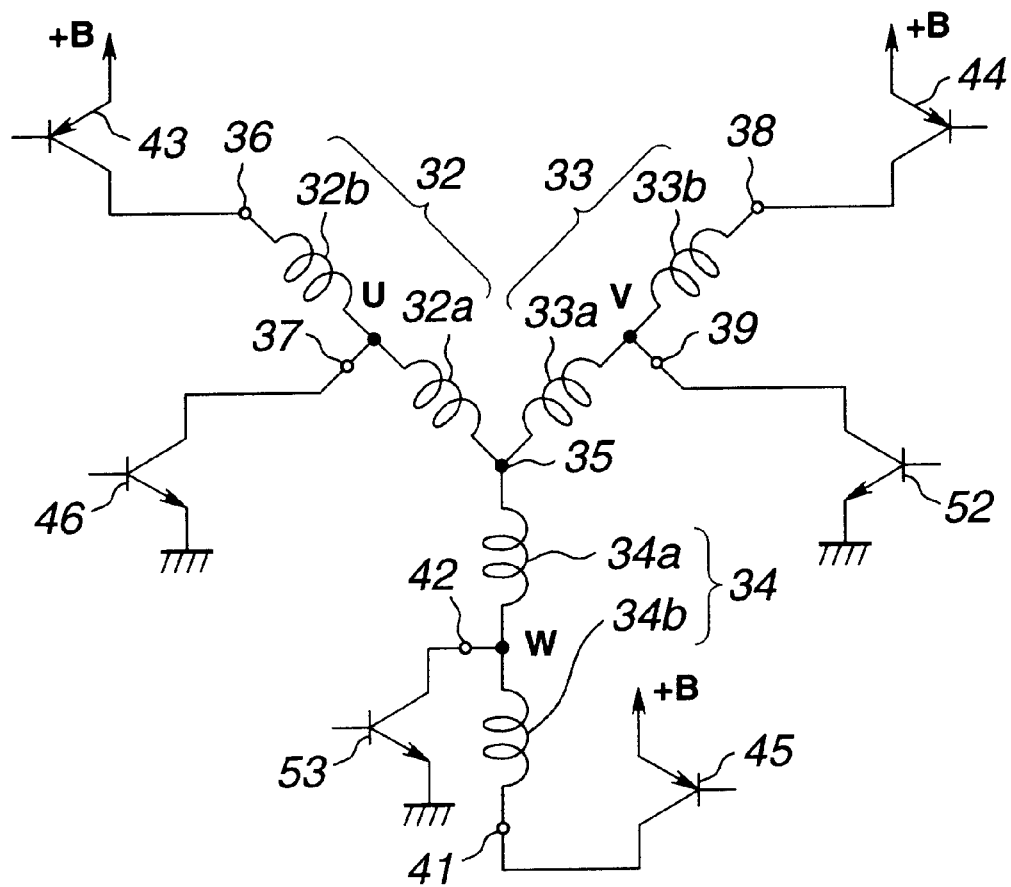
FIG. 5 is a circuit diagram illustrating a flow of current through the motor driven in the second mode.

The first to fourth transistors 43 to 48 and 51 to 54 are designed for switching the action of the motor 30 between a first mode where, as shown in FIGS. 3 and 4, the first and second halves of any two winding coils of the phase U, V, and W winding coils 32 to 34 are supplied with two opposite forward and reverse drive currents respectively, and a second mode where, as shown in FIGS. 3 and 5, one of the first and second halves of one winding coil and the same of another winding coil among the phase U, V, and W winding coils 32 to 34 are supplied with two opposite, forward and reverse drive currents respectively. The second mode uses a less number of the windings than the first mode and thus feeds the winding coils with a more amount of the drive current than the first mode. Accordingly, the torque constant in the second mode is set smaller than that of the first mode.

The action of the motor 30 is controlled by a voltage detector unit 61 for detecting the voltage in a power supply unit 60 which supplies an electric power to the motor 30, a temperature detector unit 62 for detecting the ambient temperature about the motor 30, and the motor control unit 63 for controlling the motor 30 in response to the voltage detected by the voltage detector unit 61 and the temperature detected by the temperature detector unit 62. The power supply unit 60 may be a set of dry cells or rechargeable batteries. The electric power from the power supply unit 60 is supplied to the record/playback head 21, the voltage detector unit 61, the temperature detector unit 62, and the motor control unit 63 as well as the motor 30.

The voltage detector unit 61 detects the voltage of the cells in the power supply unit 50 and generates and sends a voltage signal indicative of the cell voltage to the motor control unit 63. The temperature detector unit 62 is installed adjacent to the motor 30 so that it can correctly detect the ambient temperature about the motor 30 even if the record/playback apparatus is used under a low-temperature condition. The temperature detector unit 62 detects the ambient temperature about the motor 30 and sends a temperature signal indicative of the ambient temperature to the motor control unit 63.

In response to the voltage signal generated by the voltage detector unit 61 and temperature signal generated by the temperature detector unit 62, the motor control unit 63 performs a servo control action to run the motor 30 at a constant number of revolutions by supplying the bases of the first to fourth transistors 43 to 48 and 51 to 54 with its control signal for switching the first to fourth transistors 43 to 48 and 51 to 54. The motor control unit 63 switches the action of the motor 30 between the first mode and the second mode. More particularly, the motor control unit 63 saves therein a reference voltage, e.g. 1.2 volts, for determining the switching action between the first mode and the second mode. The reference voltage represents a lower limit of the revolution level where the servo control for running the motor 30 at the uniform number of revolutions is disabled. When the voltage signal from the voltage detector unit 61 is smaller than 1.2 volts, the motor control unit 63 switches from the first mode to the second mode. In addition, the motor control unit 63 holds therein a reference temperature, e.g. 5° C. for determining the switching action between the first mode and the second mode. The reference temperature indicates that as the ambient temperature about the motor 30 in the record/playback apparatus installed in a low-temperature condition is sharply decreased thus to increase a load on the motor 30, the number of revolutions of the motor 30 is hardly maintained. More specifically, when the temperature signal generated by the temperature detector unit 62 represents a temperature of lower than 5° C. the motor control unit 63 switches from the first mode to the second mode.

When the tape cassette 1 is loaded onto the cassette loading unit 11 in the record/playback apparatus and the playback button is pressed by a user, the operating signal of the operating unit 25 is delivered to the record/playback control unit 26. In response, the record/playback control unit 26 supplies the motor control unit 63, the preamplifier 23, and the other relevant components with its control signal. The motor control unit 63 then delivers its control signal to the bases of the first to fourth transistors 43 to 48 and 51 to 54 for directing the motor 30 to run the magnetic tape 2 at the constant speed. Accordingly, while the magnetic tape 2 is driven by the capstan 12 to run at the constant speed, the data signal recorded on the magnetic tape 2 is scanned and read out by the record/playback head 21, amplified by the preamplifier 23, and released from the loudspeaker 24.

At the time, the motor control unit 63 directs the first to fourth transistors 43 to 48 and 51 to 54 to switch between the first mode where the number of windings energized in the phase U, V, and W winding coils 32 to 34 is large and the second mode where the number of windings energized in the phase U, V, and W winding coils 32 to 34 is smaller than that of the first mode. The switching between the first mode and the second mode is executed while the magnetic tape 2 is running at the constant speed for recording or playing back the data signal.

Figure 6:
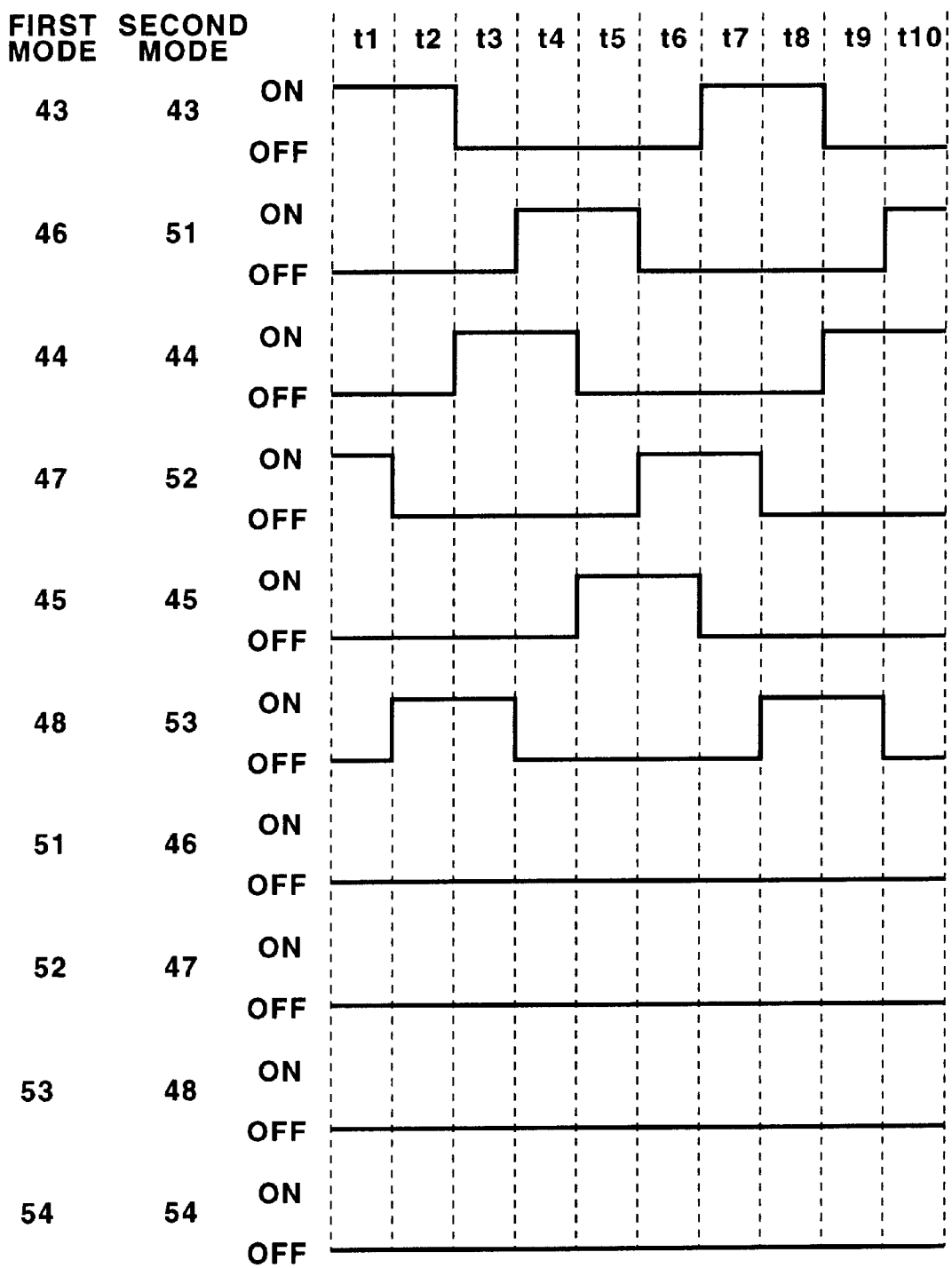
FIG. 6 is a timing chart illustrating the switching on and off of four, first to fourth, transistors which constitute a driving unit for the motor.

As shown in FIGS. 4 and 6, in the first mode where two opposite, forward and reverse drive currents are supplied to both the first coil and the second coil of any two of the phase U, V, and W rewinding coils 32 to 34, the third transistors 51 to 53 and the fourth transistor 54 remain turned off in a period of time from t1 to t10. At t1, the motor control unit 63 turns on the first transistor 42 and the second transistor 47 simultaneously but turns off the others 44 to 46 and 48 of the first and second transistors. This causes the drive current through flow from the phase U rewinding coil 32 to the phase V rewinding coil 33.

At t2, the motor control unit 63 turns on the first transistor 43 and the second transistor 48 simultaneously but turns off the others 44 to 47 of the first and second transistors. This allows the drive current through flow from the phase U rewinding coil 32 to the phase W rewinding coil 34.

At t3, the motor control unit 63 turns on the first transistor 44 and the second transistor 48 simultaneously but turns off the others 43 and 45 to 47 of the first and second transistors. This allows the drive current through flow from the phase V rewinding coil 33 to the phase W rewinding coil 34.

At t4, the motor control unit 63 turns on the first transistor 44 and the second transistor 46 simultaneously but turns off the others 43, 45, 47, and 48 of the first and second transistors. This allows the drive current through flow from the phase V rewinding coil 33 to the phase U rewinding coil 32.

At t5, the motor control unit 63 turns on the first transistor 45 and the second transistor 46 simultaneously but off the others 43, 44, 47, and 48 of the first and second transistors. This allows the drive current through flow from the phase W rewinding coil 34 to the phase U rewinding coil 32.

At t6, the motor control unit 63 turns on the first transistor 45 and the second transistor 47 simultaneously but turns off the others 43, 44, 46, and 48 of the first and second transistors. This allows the drive current through flow from the phase W rewinding coil 34 to the phase V rewinding coil 33. The action from t1 to t6 of the motor control unit 63 is then repeated.

As shown in FIGS. 5 and 6. in the second mode where two opposite, forward and reverse drive currents are supplied to either the first or second coil of one rewinding coil and of another rewinding coil among the phase U. V, and W rewinding coils 32 to 34, the second transistors 46 to 48 and the fourth transistor 54 remain turned off in the period of time from t1 to t10. At t1, the motor control unit 63 turns on the first transistor 43 and the third transistor 52 simultaneously but turns off the others 44, 45, 51, and 53 of the first and third transistors. This causes the drive current to enter the first 32a and second coil 32b of the phase U rewinding coil 32 and the first coil 33a of the phase V rewinding coil 33.

At t2, the motor control unit 63 turns on the first transistor 43 and the third transistor 53 simultaneously but turns off the others 44, 45, 5 1, and 52 of the first and third transistors. This allows the drive current to enter the first 32a and the second coil 32a of the phase U rewinding coil 32 and the first coil 34a of the phase W rewinding coil 34.

At t3, the motor control unit 63 turns on the first transistor 44 and the third transistor 53 simultaneously but turns off the others 43, 45, 51, and 52 of the first and third transistors. This allows the drive current to enter the first 33a and the second coil 33b of the phase V rewinding coil 33 and the first coil 34a of the phase W rewinding coil 34.

At t4, the motor control unit 63 turns on the first transistor 44 and the third transistor 51 simultaneously but turns off the others 43, 45, 52, and 53 of the first and third transistors. This allows the drive current to enter the first 33a and the second coil 33b of the phase V rewinding coil 33 and the first coil 32a of the phase U rewinding coil 32. At t5, the motor control unit 63 turns on the first transistor 45 and the third transistor 51 simultaneously but turns off the others 43, 44, 52, and 53 of the first and third transistors. This allows the drive current to enter the first 34a and the second coil 34b of the phase W rewinding coil 34 and the first coil 32a of the phase U rewinding coil 32.

At t6, the motor control unit 63 turns on the first transistor 45 and the third transistor 52 simultaneously but turns off the others 43, 44, 51, and 53 of the first and third transistors. This allows the drive current to enter the first 34a and the second coil 34b of the phase W rewinding coil 34 and the first coil 33a of the phase V rewinding coil 33. The action from t1 to t6 of the motor control unit 63 is then repeated.

Figure 7:
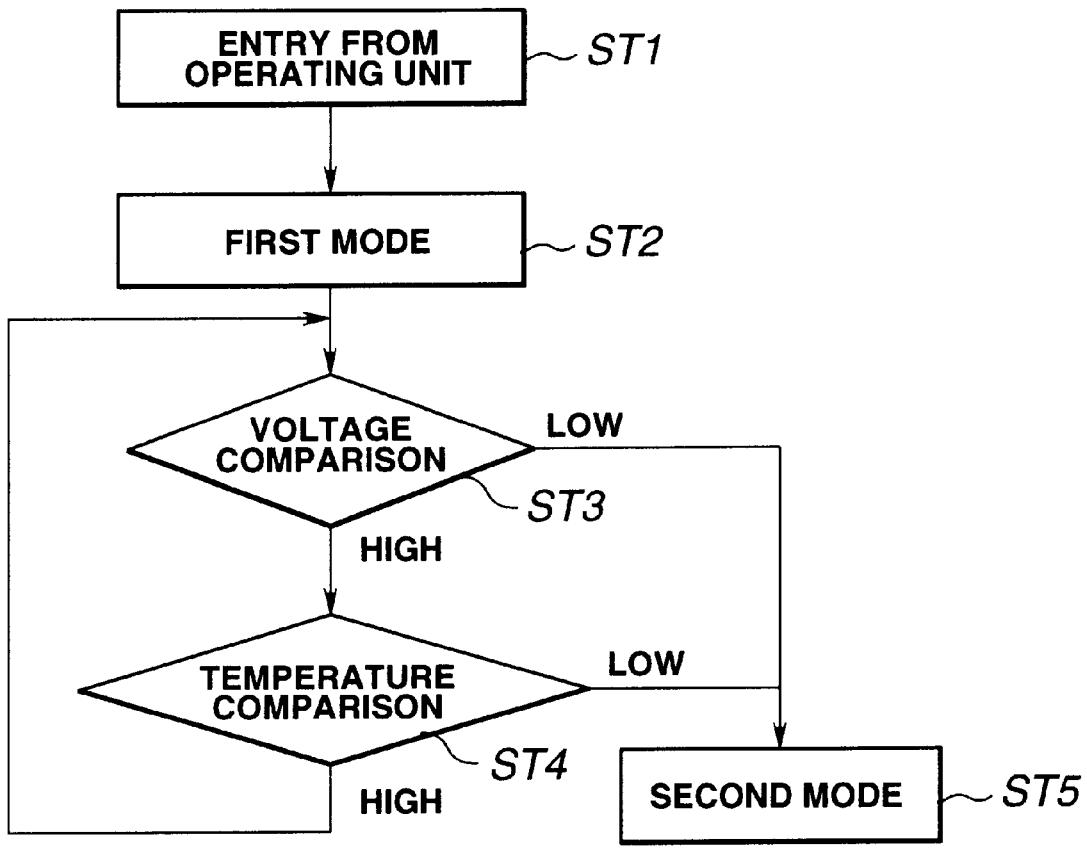
FIG. 7 is a flowchart showing a procedure of switching the motion of the motor between the first mode and the second mode depending on the source voltage and the ambient temperature detected.

The motor control unit 63 carries out a procedure of switching from the first mode to the second mode as shown in FIG. 7. The switching procedure starts with Step ST1 where the playback or recording button on the operating unit 25 is pressed down. At Step ST2, the first to fourth transistors 43 to 48 and 51 to 54 in the motor driver are switched to the first mode by the motor control unit 63 driving the motor 30 in the first mode. At Step ST3, upon receiving the voltage signal indicative of the cell voltage from the voltage detector unit 61, the motor control unit 63 examines whether the voltage in the power supply unit 60 is smaller than the reference voltage, e.g. 1.2 volts, or not. When the motor control unit 63 judges that the voltage signal from the voltage detector unit 61 indicates a voltage level of not smaller than the reference voltage, the procedure goes to Step ST4. If the voltage indicated by the voltage signal is smaller than the reference voltage, the procedure moves to Step ST5.

At Step ST4, when receiving the temperature signal from the temperature detector unit 62, the motor control unit 63 examines whether the ambient temperature is lower than the reference temperature, e.g. 5° C. or not. When the motor control unit 63 judges that the temperature signal from the temperature detector unit 62 indicates a temperature level of not lower than the reference temperature, it repeats Step ST3. If the ambient temperature indicated by the temperature signal is lower than the reference temperature, the procedure goes to Step ST5.

At Step ST5, as the motor control unit 63 judges that the voltage signal indicates smaller than the reference voltage or the temperature signal indicates lower than the reference voltage, it switches the first to fourth transistors 43 to 48 and 51 to 54 from the first mode to the second mode to run the motor 30 in the second mode. In reverse, when the voltage signal indicates not smaller than the reference voltage and the temperature signal indicates not lower than the reference temperature, the motor control unit 63 drives the motor 30 to run in the first mode in which the torque constant is higher than in the second mode to provide energy saving.

In the record/playback apparatus described above, when voltage in the power supply unit 60 is not smaller than the reference voltage and the ambient temperature about the motor 30 is not lower than the reference temperature, the motor control unit 63 switches the action of the first to fourth transistors 43 to 48 and 51 to 54 into the first mode where the number of coil windings is large, thus reducing the drive current flown through the phase U, V, and W winding coils 32 to 34 of the motor 30. Accordingly, the record/playback apparatus can conduct the energy saving while maintaining the revolution of the motor 30 at a constant rate. When the cell voltage in the power supply unit 60 is declined to a level smaller than the reference voltage, the record/playback apparatus switches from the first mode to the second mode thus reducing the number of windings used in the phase U, V, and W winding coils 32 to 34. Accordingly, the drive current flown through the phase U, V, and W winding coils 32 to 34 is increased and the revolution of the motor 30 can be maintained at a constant rate. Also, when the ambient temperature about the motor 30 is lower than the reference temperature with the record/playback apparatus placed in a low-temperature condition, the load exerted on the motor 30 increases. The record/playback apparatus then switches the action into the second mode reducing the number of windings used in the phase U, V, and W winding coils 32 to 34. Accordingly, the drive current flown through the phase U, V, and W winding coils 32 to 34 is increased and the revolution of the motor 30 can be maintained at a constant rate. The record/playback apparatus allows the rotating speed of the capstan 12 for running the magnetic tape 2 and the rotating speed of the reel axles 14 and 15 for rewinding the magnetic tape 2 onto the tape reels 3 and 4 to be maintained at constant rates in the recording or playback action regardless of change in the cell voltage and the load depending on the ambient temperature at which the record/playback apparatus is placed. Accordingly, the running of the magnetic tape 5 can be kept at a constant speed hence ensuring the accurate recording and playback actions of the data signal.

Although the record/playback apparatus of the present invention is described above with its action switched to the second mode, where the number of coil windings used is reduced, when the voltage signal produced by the voltage detector unit 61 indicates a voltage level of smaller than the reference voltage or the temperature signal produced by the temperature detector unit 62 indicates a temperature level of lower than the reference temperature, a modification may be provided in which the number of coil windings used is varied between when the voltage is smaller than the reference voltage and when the temperature is lower than the reference temperature or between two different modes.

Figure 8:
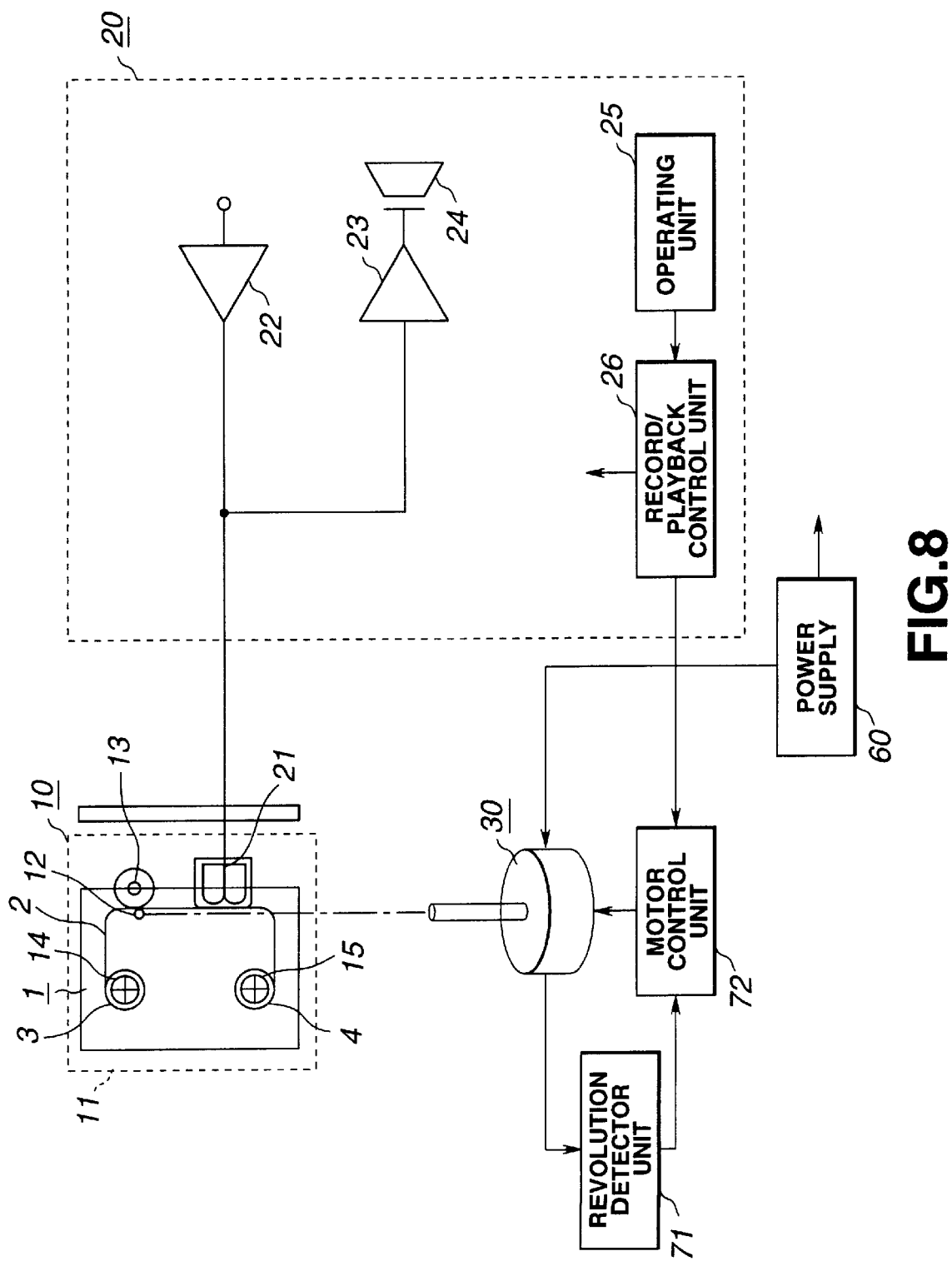
FIG. 8 is a block diagram illustrating an arrangement of a modified record/playback apparatus provided with a revolution detecting unit for detecting the number of revolutions of its motor.

The modification of the record/playback apparatus will now be described. As shown in FIG. 8, the modification has a revolution detector unit 71 which is provided for detecting the number of revolutions of the motor 30, hence replacing the voltage detector unit 61 and the temperature detector unit 62. The modified record/playback apparatus is thus characterized in that the action of the first to fourth transistors 43 to 48 and 51 to 54 is controlled according to the number of revolutions of the motor 30 detected by the revolution detector unit 71 to switch the motion of the motor 30 between the first mode and the second mode. In the description, like components are denoted by like numerals as those of the record/playback apparatus previously described and will be explained in no more detail.

Figure 9:
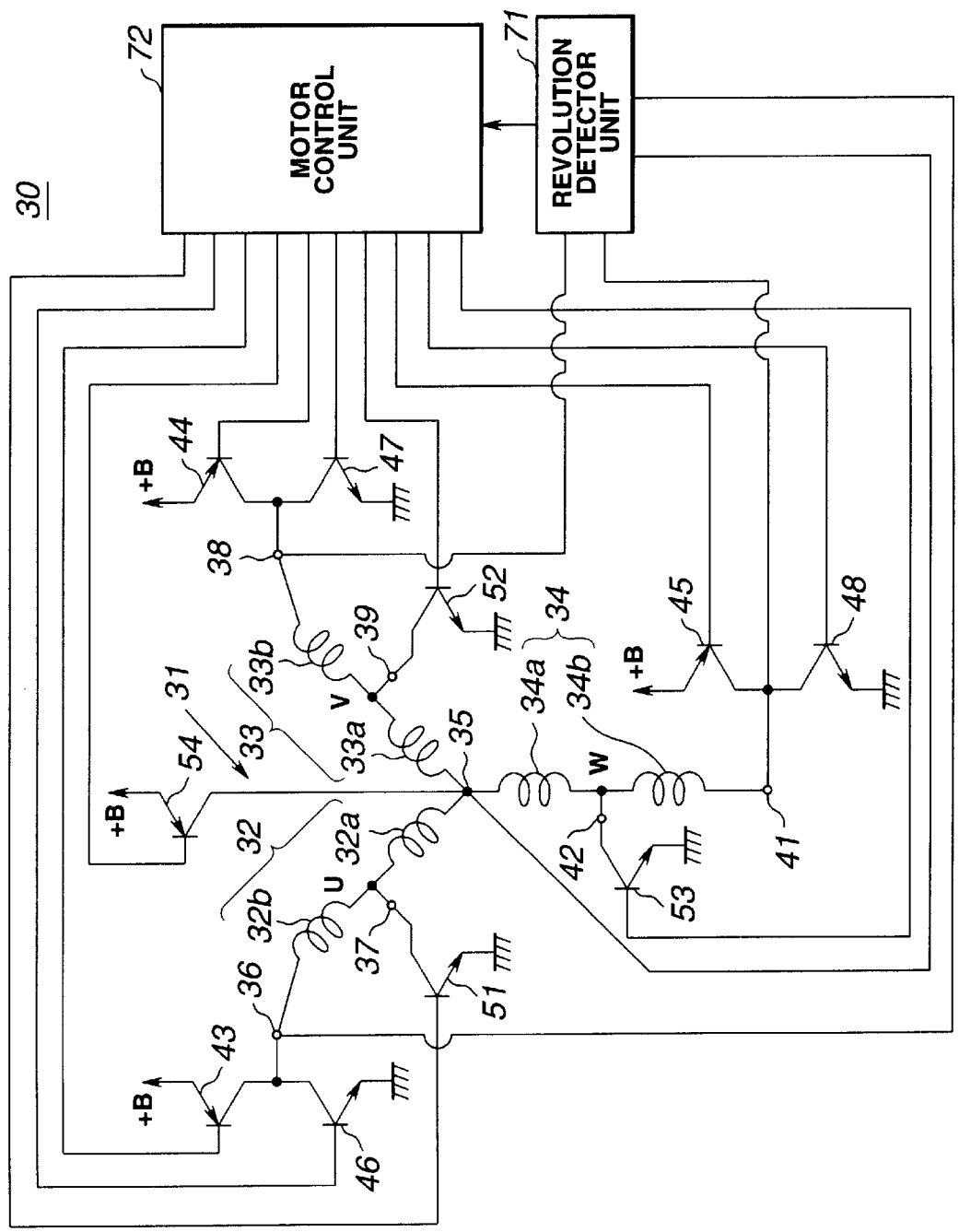
FIG. 9 is a circuit diagram illustrating the motor in the modified record/playback apparatus.

As shown in FIGS. 8 and 9, the revolution detector unit 71 for detecting the revolution of the motor 30 is connected between the node 35 joined with one end of the phase U, V, and W winding coils 32 to 34 and the terminals 36, 38, and 41 joined with the other ends of the phase U, V, and W winding coils 32 to 34. The revolution detector unit 71 detects the number of revolutions and the phase of revolution of the motor 30 by checking the period and the phase of a counter-electromotive force on the phase U, V, and W winding coils 32 to 34. A resultant revolution signal indicative of the phase and the number of revolutions of the motor 30 is delivered from the revolution detector 71 to a motor control unit 72.

When receiving the revolution signal from the revolution detector unit 71, the motor control unit 72 performs a servo control action to drive the motor 30 at a constant rate of revolution and sends its control signal to the bases of the first to fourth transistors 43 to 48 and 51 to 54 for switching their action. Then, the switching action of the motor control unit 72 between the first mode and the second mode is carried out. Particularly in the motor control unit 72, the revolution signal produced in the second mode by the revolution detector unit 71 is subtracted by the revolution signal produced in the first mode by the revolution detector unit 71 to switch between the first mode and the second mode.

Figure 10:
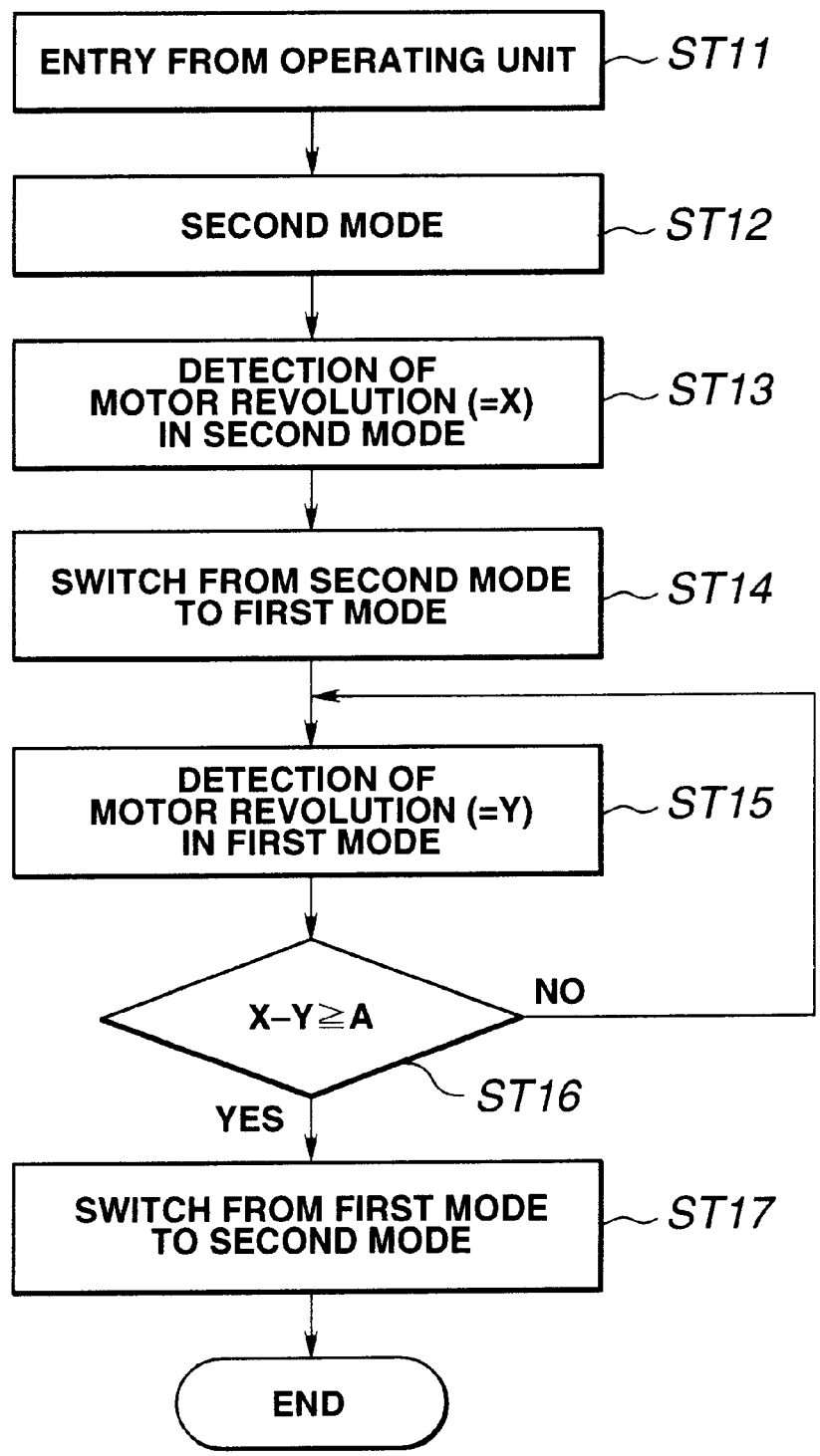
FIG. 10 is a flowchart illustrating a procedure of switching the motion of the motor between the first mode and the second mode depending on the number of revolutions of the motor.

The motor control unit 72 of the modified record/playback apparatus performs a switching action between the first mode and the second mode as shown in FIG. 10. The switching action starts with Step ST11 where the record or playback button on the operating unit 25 is pressed down. At Step ST12, the motor control unit 72 switches the action of the first to fourth transistors 43 to 48 and 51 to 54 to the second mode for driving the motor 30 in the second mode. As the revolution of the motor 30 in the second mode has become stable, its signal X is generated at Step ST13 by the revolution detector unit 71 and transmitted to the motor control unit 72. The motor control unit 72 saves the revolution signal X as a reference revolution signal for the motor 30.

At Step ST14, the motor control unit 72 supplies the first to fourth transistors 43 to 48 and 51 to 54 with its control signal for switching from the second mode to the first mode. When the first to fourth transistors 43 to 48 and 51 to 54 are switched to the first mode by the motor control unit 72, the motor 30 runs in the first mode. As the revolution of the motor 30 in the first mode has become stable, its signal Y is generated at Step ST15 by the revolution detector unit 71 and transmitted to the motor control unit 72. The motor control unit 72 then saves the revolution signal Y of the first mode.

At Step ST16, the motor control unit 72 subtracts the revolution signal Y indicative of the first mode of the motor 30 from the revolution signal X of the second mode of the motor 30 and examines whether or not a result of the subtraction is smaller than a reference value A saved preliminarily in the motor control unit 72. When the result of the subtraction is not smaller than the reference value A, the procedure advances to Step ST17. If the result is smaller than the reference value A, the procedure returns back to Step ST15 for repeating the generation of the revolution signal Y from the first mode of the motor 30.

As it judges at Step ST16 that the result of the subtraction is not smaller than the reference value A, the motor control unit 72 supplies at Step ST17 the first to fourth transistors 35 to 44 with its control signal for switching from the first mode to the second mode. When the action of the first to fourth transistors 43 to 48 and 51 to 54 is switched to the second mode by the motor control unit 72, the motor 30 starts running in the second mode. Then, whenever the record or playback is pressed, the motor control unit 72 repeats the steps from ST1 to ST7. In other words, when the result of the subtraction of the revolution signal Y of the first mode from the revolution signal X of the second mode is not smaller than the reference value A, the motion of the motor 30 is switched to the second mode for increasing the number of revolutions of the motor 30 to have a constant rate of the revolution. When the result of the subtraction is smaller than the reference value A, the motion of the motor 30 is switched to the first mode of which the torque constant is higher than that of the second mode. As a result, the energy saving can be ensured.

In the modified record/playback apparatus, when the result of the subtraction of the revolution signal Y indicative of the first mode of the motor 30 from the revolution signal X indicative of the second mode of the motor 30 is smaller than the reference value A, i.e. the cell voltage in the power supply unit 52 is high, the motor control unit 72 drives the first to fourth transistors 43 to 48 and 51 to 54 to switch the motion of the motor 30 to the first mode where the number of windings used in the phase U, V, and W winding coils 32 to 34 of the motor 30 is increased. Accordingly, the motor 30 is driven with a reduced rate of the drive current flown through the phase U, V, and W winding coils 32 to 34, thus ensuring the energy saving.

When the result of the subtraction of the number of revolution Y of the first mode of the motor 30 from the number of revolutions X of the second mode of the motor 30 is not smaller than the reference value A, i.e. the cell voltage in the power supply unit 52 is low, the motor control unit 72 directs the first to fourth transistors 43 to 48 and 51 to 54 to switch the motion of the motor 30 to the second mode where the number of windings used in the phase U, V, and W winding coils 32 to 34 is smaller than that in the first mode. Accordingly, the motor 30 is driven with an increased rate of the drive current flown through the phase U, V, and W winding coils 32 to 34. More particularly, the motor 30 is decreased in the torque and increased in the number of revolutions and will hence be driven at the constant speed.

The modified record/playback apparatus allows the number of windings used in the phase U,. V, and W winding coils 32 to 34 to be varied depending on the number of revolutions of the motor 30 detected by the revolution detector unit 71 thus to control the drive current flown through the winding coils 32 to 34, hence providing a degree of energy saving regardless of the cell voltage in the power supply unit 60 while maintaining the constant speed of the motor 30. With the modified record/playback apparatus ensuring the energy saving in the recording or playback action, the rotating speed of the capstan 13 for running the magnetic tape 2 and the rotating speed of the reel axles 15 and 16 for rewinding the magnetic tape 2 onto the tape reels 3 and 4 can be made constant, contributing to the accurate recording or playback of the data signal. Whenever the record or playback button is pressed, the revolution detector unit 71 detects the revolution of the motor 30 and the motor control unit 72 carries out the switching from one mode to the other in the modified record/playback apparatus, whereby the motor 30 can be driven at an optimum condition according to the environmental factor or the ambient temperature.

Although the description of the motor control unit 72 is made in which the detection of the number of revolutions of the motor 30 in the second mode is followed by the detection of the number of revolutions of the motor 30 in the first mode, the detection of the number of revolutions may be reversed by detecting first the number of revolution of the motor 30 in the first mode and then the number of revolutions of the motor 30 in the second mode. Also, the switching between the first mode and the second mode may be determined through examining whether a resultant of subtraction of the revolution signal Y of the second mode from the revolution signal X of the first mode is lower than the reference value A or not.

Alternatively, the switching between the first mode and the second mode may be determined by examining whether or not the revolution signal supplied from the revolution detector unit 71 to the motor control unit 72 is smaller than a reference revolution signal which has been specified and saved in the motor control unit 72.

The present invention is not limited to the record/playback apparatus described above provided with a three-phase direct-current motor but may be applied to such apparatus provided with an n-phase motor, n being greater than three. Although each of the phase U, V, and W winding coils 32 of the motor 30 described above is divided into two sections, it may comprise m sections. In that case, the number of windings of the coils can be changed in more steps with the use of an increased, corresponding number of the transistors and the energy saving will be improved. Also, this permits the running speed of the magnetic tape 2 to be switched between a high speed mode for the forward and rewind actions and a constant speed mode for the recording and playback actions.

Industrial Applicability

According to the present invention, the number of windings of each phase of the motor is changed to control the motion of the motor depending on the voltage detected by a voltage detecting means and the temperature detected by a temperature detecting means. Thus, the motor can be driven at a constant speed regardless of a change in the load to the motor caused by an ambient temperature about the motor or a change in the source voltage, providing a degree of energy saving.

Also, according to the present invention, the motion of the motor is controlled by the number of revolutions detected by a revolution detecting means. This allows the motor to be driven at a constant speed regardless of variation of the motor characteristics or a change in the load to the motor caused by an ambient temperature about the motor, hence improving the energy saving.

What is claimed is:

1. A drive apparatus for driving a three-phase direct-current motor comprising:
    driving means for driving the three-phase direct-current motor wherein a number of windings in a coil of each phase is changed so that the motor operates in a first mode wherein all the windings in the coil of each phase are used and in a second mode where the number of windings used is smaller than in the first mode;
    source voltage detecting means for detecting a source voltage;
    temperature detecting means for detecting an ambient temperature in a vicinity of the motor; and
    controlling means for switching an action of the driving means to operate the motor in one of the first mode and the second mode so that a constant rotational speed is maintained in response to detection results from the source voltage detecting means and the temperature detecting means.

2. The drive apparatus according to claim 1, wherein the source voltage is supplied by a battery and the controlling means switches from the first mode to the second mode when the source voltage detecting means detects that the source voltage supplied by the battery drops to lower than a predetermined voltage level.

3. The drive apparatus according to claim 1, wherein the controlling means switches from the first mode to the second mode when the ambient temperature detected by the temperature detecting means drops to lower than a predetermined temperature level.

4. The drive apparatus according to claim 1, wherein the driving means includes a plurality of switching devices actuated by the controlling means for switching a flow of electric current through the windings of each phase of the motor.

5. An apparatus for recording and/or playing back on a recording medium comprising;
    head means for recording or playing back on the recording medium;
    a record and/or playback block including a three-phase direct-current motor for moving the recording medium relative to the head means;
    driving means for driving the motor wherein a number of windings in a coil of each phase is changed so that the motor operates in a first mode wherein all the windings in the coil of each phase are used and in a second mode where the number of windings used is smaller than in the first mode;
    source voltage detecting means for detecting a source voltage from a battery;
    temperature detecting means for detecting an ambient temperature in a vicinity of the motor; and
    controlling means for switching an action of the driving means to operate the motor in one of the first mode and the second mode so that a constant rotational speed is maintained in response to detection results from the source voltage detecting means and the temperature detecting means.

6. The apparatus for recording and/or playing back on a recording medium according to claim 5, wherein the controlling means switches from the first mode to the second mode when the source voltage detecting means detects that the source voltage supplied by the battery drops to lower than a predetermined voltage level.

7. The apparatus for recording and/or playing back on a recording medium according to claim 5, wherein the controlling means switches from the first mode to the second mode when the ambient temperature detected by the temperature detecting means drops to lower than a predetermined temperature level.

8. The apparatus for recording and/or playing back on a recording medium according to claim 5, wherein the driving means includes a plurality of switching devices actuated by the controlling means for switching a flow of electric current through the windings of each phase of the motor.

9. A drive apparatus for driving a three-phase direct-current motor comprising:
    driving means for driving the three-phase direct-current motor wherein a number of windings in a coil of each phase is changed so that the motor operates in a first mode wherein all the windings in the coil of each phase are used and in a second mode where the number of windings used is smaller than in the first mode;
    revolution detecting means for detecting a rotational speed of the motor; and
    controlling means for switching an action of the driving means to operate the motor in one of the first mode and the second mode so that a constant rotational speed is maintained in response to a detection result from the revolution detecting means.

10. The drive apparatus according to claim 9, wherein the controlling means switches the action of the driving means when a difference between a number of revolutions of the motor driven in the second mode and a number of revolutions of the motor driven in the first mode is higher than a predetermined value.

11. The drive apparatus according to claim 10, wherein the controlling means switches the action of the driving means to the second mode when the difference between the number of revolutions of the motor driven in the second mode and the number of revolutions of the motor driven in the first mode is higher than the predetermined value.

12. The drive apparatus according to claim 11, wherein the controlling means first controls the driving means to run the motor in the second mode and then the number of revolutions of the motor driven in the second mode is detected.

13. The drive apparatus according to claim 9, wherein the revolution detecting means detects a number of revolutions of the motor on a basis of a period of a counter-electromotive force in coils of the motor.

14. The drive apparatus according to claim 9, wherein the driving means has a plurality of switching devices actuated by the controlling means for switching a flow of electric current through the windings of each phase of the motor.

15. An apparatus for recording and/or playing back on a recording medium comprising;

head means for recording or playing back on the recording medium;

a record and/or playback block having a three-phase direct-current motor for moving the recording medium relative to the head means;

driving means for driving the three-phase direct-current motor wherein a number of windings in the coil of each phase is changed so that the motor operates in a first mode wherein all the windings in the coil of each phase are used and in a second mode where the number of windings used is smaller than in the first mode;

revolution detecting means for detecting a rotational speed of the motor; and controlling means for switching an action of the driving means to operate the motor in one of the first mode and the second mode so that a constant rotational speed is maintained in response to a detection result from the revolution detecting means.

16. The apparatus for recording and/or playing back on a recording medium according to claim 15, wherein the controlling means switches the action of the driving means when a difference between a number of revolutions of the motor driven in the second mode and a number of revolutions of the motor driven in the first mode is higher than a predetermined value.

17. The apparatus for recording and/or playing back on a recording medium according to claim 16, wherein the controlling means switches the action of the driving means to the second mode when the difference between the number of revolutions of the motor driven in the second mode and the number of revolutions of the motor driven in the first mode is higher than the predetermined value.

18. The apparatus for recording and/or playing back on a recording medium according to claim 17, wherein the controlling means first controls the driving means to run the motor in the second mode and then the number of revolutions of the motor driven in the second mode is detected.

19. The apparatus for recording and/or playing back on a recording medium according to claim 15, wherein the revolution detecting means detects a number of revolutions of the motor on a basis of a period of a counter-electromotive force in coils of the motor.

20. The apparatus for recording and/or playing back on a recording medium according to claim 15, wherein the driving means includes a plurality of switching devices actuated by the controlling means for switching a flow of electric current through the windings of each phase of the motor.

21. A driving method for driving a three-phase direct-current motor comprising the steps of:

detecting a rotational speed of the three-phase direct-current motor; and switching the motor between a first mode wherein all the windings of a coil of each phase are used and a second mode wherein a number of windings used is smaller than in the first mode so that a constant rotational speed of the motor is maintained in response to a detection result from the detecting step.

22. The driving method according to claim 21, wherein the switching between the first mode and the second mode is carried out when a difference between a number of revolutions of the motor driven in the second mode and a number of revolutions of the motor driven in the first mode is higher than a predetermined value.

23. The driving method according to claim 22, wherein the motor is switched to the second mode when the difference between the number of revolutions of the motor driven in the second mode and the number of revolutions of the motor driven in the first mode is higher than the predetermined value.

24. The driving method according to claim 23, wherein the motor is driven in the second mode and then the number of revolutions of the motor driven in the second mode is detected.

\* \* \* \* \*